A. L. McGREGOR.
AUTOMOBILE BUMPER.
APPLICATION FILED OCT. 19, 1912.

1,088,832.

Patented Mar. 3, 1914.

Witnesses,
S. S. Mann
S. N. Pond

Inventor,
Allan L. McGregor,
By Offield, Towle, Graves & Offield
Attys.

UNITED STATES PATENT OFFICE.

ALLAN L. McGREGOR, OF CHICAGO, ILLINOIS.

AUTOMOBILE-BUMPER.

1,088,832.	Specification of Letters Patent.	Patented Mar. 3, 1914.

Application filed October 19, 1912. Serial No. 726,589.

*To all whom it may concern:*

Be it known that I, ALLAN L. MCGREGOR, a citizen of the United States, residing at Chicago, in the county of Cook and State of Illinois, have invented certain new and useful Improvements in Automobile-Bumpers, of which the following is a specification This invention relates to automobile bumpers or fenders, and has reference more particularly to a new and improved construction of said bumper that is especially designed and adapted for application to and use in connection with the well known Ford automobile, and similar automobiles that are structurally characterized by the provision of a front body bolster and semi-elliptic spring centrally united and both disposed in the vertical plane of the front axle, and a radiator frame supported on said body bolster. In automobiles of this type, the problem involved in the structural form and mode of attachment of a bumper is by no means as simple as in the case of the more usual type of automobiles that are characterized by the provision of forwardly extending knuckles which constitute an easy and practically obvious point of attachment.

My invention and its mode of application to the automobile front will be readily understood when considered in connection with the accompanying drawings, in which—

Figure 1:
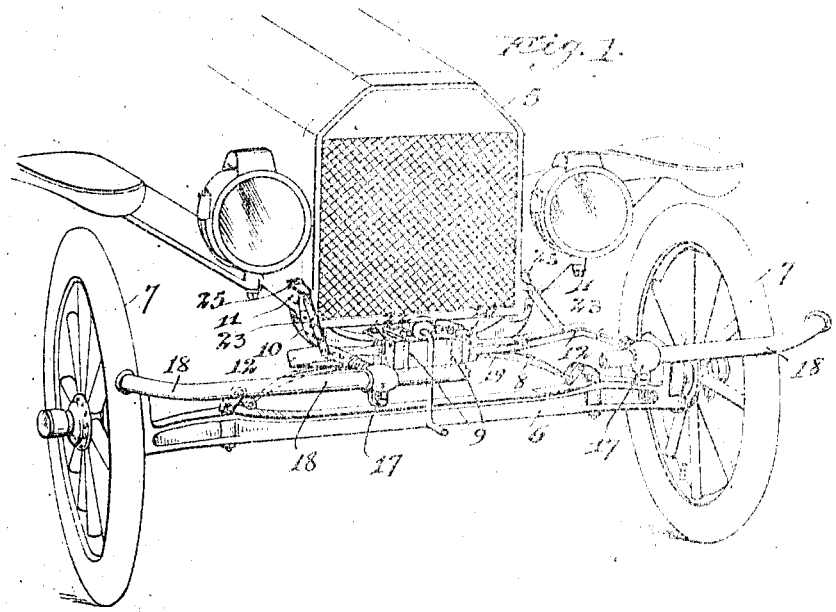
Figure 2:
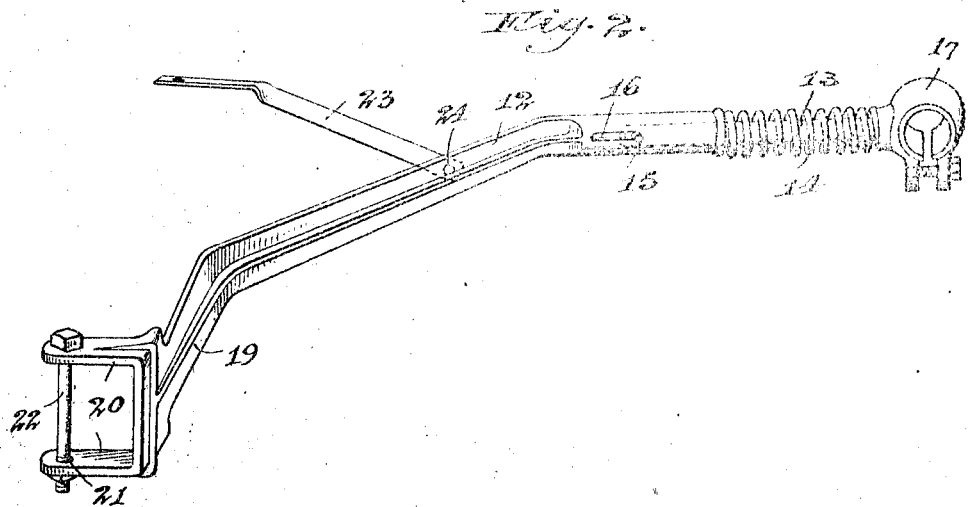

Figure 1 is a perspective elevation of the front portion of a Ford automobile showing my improved bumper applied thereto, the bumper bar being broken out between its ends to disclose parts lying there behind; and Fig. 2 is a side perspective elevation of one of the carrying arms of the bumper bar and its parts.

Referring to the drawings, 5 designates the radiator frame, 6 the front axle, and 7 the front wheels of an automobile of the Ford type.

8 is the front spring, of the semi-elliptic type, disposed above and in the vertical plane of the front axle 6 and suitably articulated thereto at its ends, as shown. Resting centrally upon the spring 8 and secured thereto by a central clamp 9, is the upwardly curved front body bolster 10, the ends of which engage beneath and are bolted to laterally extending lugs 11 on the sides of the radiator frame 5.

Referring now to my improved bumper, 12 designates the main forwardly projecting portion of each of a pair of inversely disposed bumper-bar carrying-arms. The outer end portion of each arm is formed by a rod 13 that telescopes within the tubular forward end of the main section 12 and is surrounded by a cushioning spring 14. The rod 13 is confined against displacement by a pin 15 at its inner end playing through a slot 16 in the barreled forward portion of the arm section 12; and on the outer end of the rod 13 is a clamp 17 to which the usual transversely extending bumper-bar 18 is secured.

The lower or inner portion of the arm section 12 is bent inwardly substantially at a right angle, said portion being shown at 19 and terminating in a horizontal yoke member 20 that is adapted to snugly straddle the body bolster 10 and spring 8 at one side of the center of said parts, and preferably adjacent to the end of the central clamp 9. The arms of the yoke 20 are apertured at 21 to receive a bolt 22, the yoke 20 and bolt 22 thus unitedly forming a clamp for rigidly securing the inner end of the arm to the bolster and spring. Preferably, and as herein shown, the bumper-bar carrying-arms are braced to the radiator frame by means of brace-bars 23, each of which is riveted at 24 to the main section 12 of the arm, and, at its opposite end, is secured to one of the lateral lugs 11 of the radiator frame by means of a bolt 25 which may conveniently be the same bolt that is used to connect the radiator frame to the body bolster.

The described construction provides a very simple, strong, inexpensive and easily applied bumper for automobiles of the type specified.

I claim—

1. An automobile bumper adapted for application to automobiles having a front body bolster and spring centrally united and both disposed in the vertical plane of the front axle, said bumper comprising a bumper-bar, and carrying-arms therefor formed at their inner ends with clamps adapted to embrace said body bolster and spring on opposite sides of their center, respectively, substantially as described.

2. An automobile bumper adapted for application to automobiles having a front body bolster and spring centrally united and both disposed in the vertical plane of the front axle, and a radiator frame supported on said body bolster, said bumper comprising a bumper-bar, carrying-arms therefor formed at their inner ends with clamps adapted to embrace said body bolster and spring on opposite sides of their center, respectively, and braces connecting said arms to the sides of said radiator frame, substantially as described.

3. An automobile bumper adapted for application to automobiles having a front body bolster and spring centrally united and both disposed in the vertical plane of the front axle, and a radiator frame supported on said body bolster, said bumper comprising a bumper-bar, carrying-arms therefor having inwardly bent inner portions terminating in clamps adapted to embrace said body bolster and spring on opposite sides of their center, respectively, and braces connecting the forwardly extending portions of said arms to the sides of said radiator frame substantially as described.

4. An automobile bumper having, in combination, a bumper-bar, supports for the bar extending rearwardly therefrom and provided, at their rear portions, with inwardly-directed transverse extensions adapted to engage and lie parallel with a transverse frame-member of an automobile, and means for fixing said extensions to said frame-member.

ALLAN L. McGREGOR.

Witnesses:
E. G. INGERSOLL,
MARY M. LEPPO.